Oct. 4, 1955    E. BOWMAN    2,719,659
FISHERMAN'S POLE SUPPORT
Filed March 17, 1952
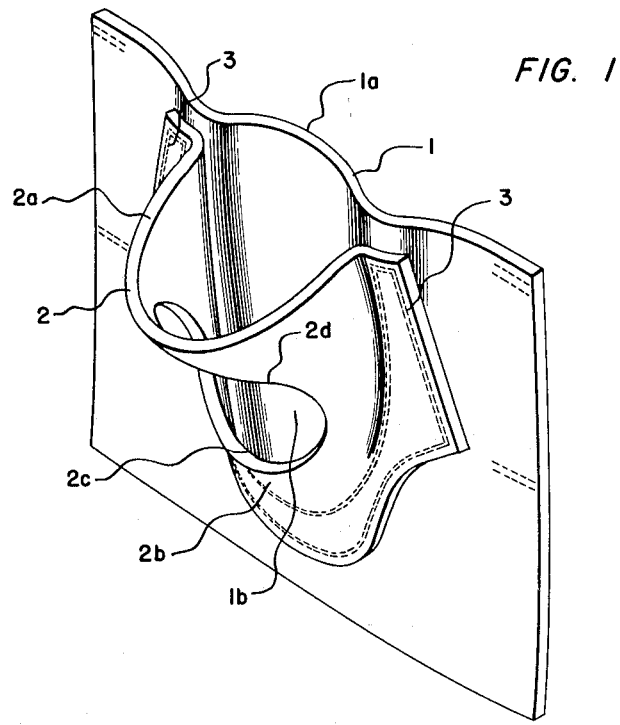
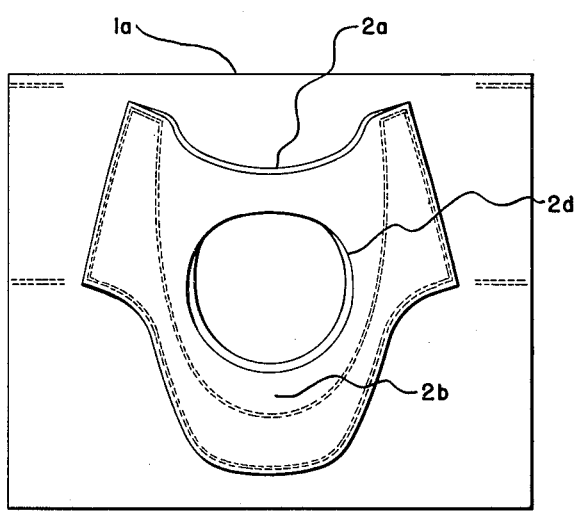
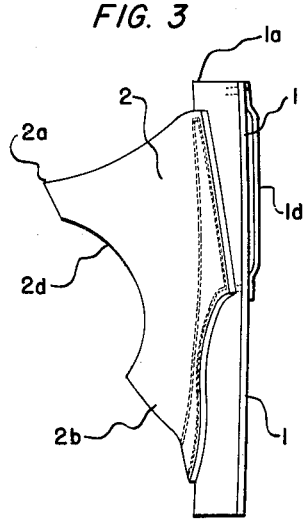
INVENTOR.
ERNEST BOWMAN
BY
Wm. H. Dean
AGENT

# United States Patent Office 2,719,659
Patented Oct. 4, 1955

2,719,659

FISHERMAN'S POLE SUPPORT

Ernest Bowman, Owatonna, Minn., assignor to
Fred N. Mamer, San Diego, Calif.

Application March 17, 1952, Serial No. 276,931

1 Claim. (Cl. 224—5)

My invention relates to a fisherman's pole support for use in surf and sport fishing and the objects of my invention are:

First, to provide a support of this class which may be readily and easily used alternately as a surf fishing pole support for holding a pole vertically and a fishing pole butt rest for use when fighting heavy game fish;

Second, to provide a fisherman's pole support of this class which is readily used for either supporting surf fishing poles or heavy game fishing poles without alteration;

Third, to provide a fisherman's pole support of this class which is very compact and easy to wear, and which has versatile utility;

Fourth, to provide a fisherman's pole support of this class which may be supported on a conventional belt;

Fifth, to provide a fisherman's pole support of this class having an upwardly directed opening and a horizontally directed opening in the same member which is fixed to a relatively semi-rigid back member whereby a sport fishing pole may be abutted to the back member through the frontal opening and a surf fishing pole may be inserted through the upper opening for substantially vertical support thereof as desired; and Sixth, to provide a fisherman's pole support of this class which is very simple and economical of construction, efficient in operation and which will not readily deteriorate or get out of order.

With these and other objects in view as will appear hereinafter my invention consists of certain novel features of construction, combination and arrangement of parts and portions as will be hereinafter described in detail and particularly set forth in the appended claim, reference being had to the accompanying drawings and to the characters of reference thereon forming a part of this application in which:

Fig. 1 is a perspective view of the frontal portion of my fisherman's pole support.

Fig. 2 is a front elevational view thereof, and

Fig. 3 is a side elevational view thereof taken at substantially 90 degrees from that as shown in Fig. 2.

Similar characters of reference refer to similar parts and portions throughout the several views of the drawings.

The back plate 1 and the pole butt support 2 constitute the principal parts and portions of my fisherman's pole support.

As shown in Fig. 1 of the drawings, the back plate 1 is preferably made of heavy semi-rigid leather or the like while the pole butt support 2 may be made of similar material and secured to the back plate 1 by means of stitching 3 or any other suitable means as desired. It will be here noted that the back plate 1 and the pole butt support 2 may be integral if made of certain synthetic materials such as heavy vinyl plastic material or the like. The pole butt support 2 is provided with an arcuate upper edge 2a and the back plate 1 is provided with an opposed arcuate portion 1a providing an upwardly directed opening into which the butt of a fisherman's pole might be positioned. The lower end 2b of the pole butt support 2 is engaged and fixed in contiguous relation with the back plate 1 and is provided with an outer wall portion 2c at the edge of the frontal opening 2d which is adapted to support the lower end of a pole extending substantially vertical in my fisherman's pole support. The frontal opening 2d provides an aperture through which the butt of a sport fisherman's pole may be inserted so that the butt of such a pole may bear against the frontal portion 1b of the back plate 1 and be maintained in location in the opening 2d. Secured to the back of the back plate 1 are belt loops 1d adapted to engage any conventional belt as desired for supporting my fisherman's pole support at the frontal portion of a fisherman's body.

The operation of my fisherman's pole support is substantially as follows: When my fisherman's pole support is worn on a fisherman's belt and positioned at the frontal side of the fisherman's body, the butt end of a surf fishing pole may be inserted downwardly intermediate the edges 1a and 2a of the back plate 1 and the pole butt support 2 respectively, while the lower butt end of the pole may engage the wall portion 2b of the pole butt support 2, thus the pole may be maintained with a substantially vertical position and supported while the fisherman uses his hands to bait hooks or care for other fishing operations. When it is desired to use my fisherman's pole support for the purpose of sport fishing, wherein the fisherman battles a heavy fish, the butt end of the sport fishing pole is placed through the opening 2d and rests against the outer wall 1b of the back plate 1 so that the fisherman may carry the stress of the force at the butt end of the pole adjacent his abdomen. The substantially rigid character of the back plate 1 and its projected area distributes the force exerted at the butt end of the pole throughout a large area of the fisherman's abdomen so that his muscular structure may safely carry the stress imposed on the outer wall 1b of the back plate 1.

Though I have shown and described a particular construction, combination and arrangement of parts and portions, I do not wish to be limited to this particular construction, combination and arrangement but desire to include in the scope of my invention the construction, combination and arrangement substantially as set forth in the appended claim.

Having thus described my invention, what I claim as new and desire to secure by Letters Patent is:

A fisherman's pole support comprising a substantially inflexible back plate having frontal and rear faces, a belt-engaging means on the rear face thereof whereby the plate can be maintained in substantially vertical position, said plate having an arcuate portion extending upwardly from a central portion thereof and being horizontally concave as view from the frontal face thereof, a pocket member secured to said frontal face and including an upper strap-like portion opposed to said arcuate portion of the back plate and arcuate in the opposite direction, and an outwardly extending wall portion in spaced relation beneath said strap-like portion, whereby the pocket member is closed at the bottom by said wall portion, said wall portion being positioned to support the butt of a fisherman's pole inserted selectively between said strap-like portion and said back plate and between the strap-like portion and the wall portion.

References Cited in the file of this patent

UNITED STATES PATENTS

| | | |
|---|---|---|
| 615,055 | Woods | Nov. 29, 1898 |
| 782,357 | Pogue | Feb. 14, 1905 |
| 1,352,663 | Hafner | Sept. 14, 1920 |
| 1,413,290 | O'Leary | Apr. 18, 1922 |
| 2,576,624 | Miller | Nov. 27, 1951 |

FOREIGN PATENTS

| | | |
|---|---|---|
| 658,669 | Germany | Apr. 7, 1938 |
| 211,395 | Switzerland | Dec. 2, 1940 |